Figure 1:
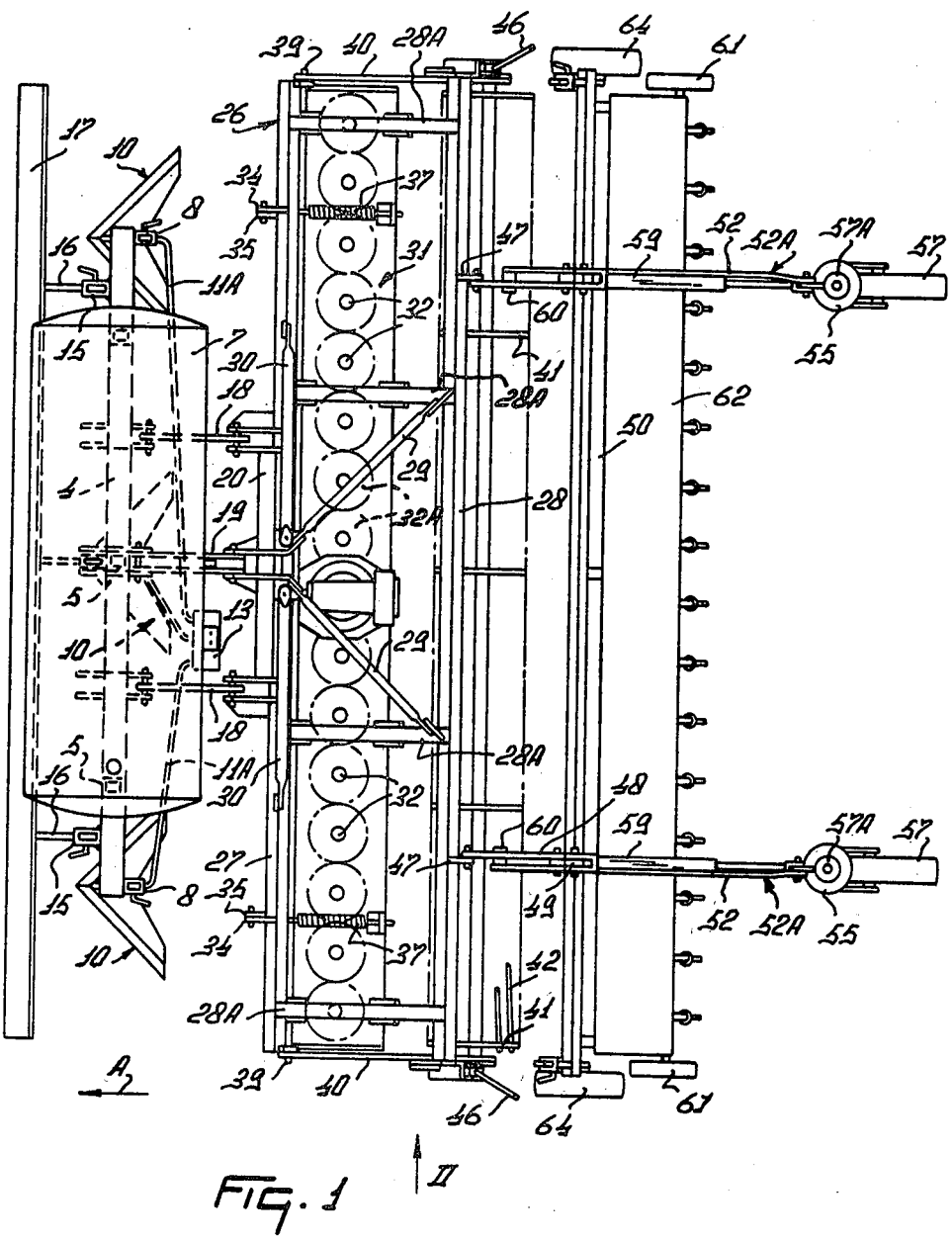

United States Patent [19]
van der Lely

[11] 4,108,089
[45] Aug. 22, 1978

[54] AGRICULTURAL IMPLEMENTS

[76] Inventor: Cornelis van der Lely, 7, Brüschenrain, Zug, Switzerland

[21] Appl. No.: 716,570

[22] Filed: Aug. 23, 1976

[30] Foreign Application Priority Data

Aug. 22, 1975 [NL] Netherlands .......................... 7509938

[51] Int. Cl.² ............................................ A01C 23/02
[52] U.S. Cl. ............................................ 111/7; 111/52; 111/73; 111/77; 172/59; 172/484; 172/615; 172/620
[58] Field of Search ........................ 111/6, 7, 12, 13, 18, 111/20, 22, 24, 55, 56, 85, 1, 81, 73, 77, 80, 52, 53; 172/52, 59, 70, 239, 523, 526, 449, 484, 615, 619, 620, 776

[56] References Cited

U.S. PATENT DOCUMENTS

| | | | |
|---|---|---|---|
| 1,725,190 | 8/1929 | Hicks | 111/7 |
| 3,038,424 | 6/1962 | Johnson | 111/7 |
| 3,111,917 | 11/1963 | Dawrs | 111/6 |
| 3,170,421 | 2/1965 | Norris et al. | 111/7 X |
| 3,200,778 | 8/1965 | Whelchel | 111/85 |
| 3,397,658 | 8/1968 | Hansen et al. | 111/85 |
| 3,625,166 | 12/1971 | Woodley | 111/7 |
| 3,633,679 | 1/1972 | Dahlberg et al. | 172/484 X |
| 3,701,327 | 10/1972 | Krumholz | 111/85 |
| 3,705,560 | 12/1972 | Lappin | 111/85 |
| 3,810,434 | 5/1974 | van der Lely et al. | 172/59 X |
| 3,826,314 | 7/1974 | van der Lely et al. | 172/59 |
| 3,946,681 | 3/1976 | Sylvester | 111/7 |
| 3,983,943 | 10/1976 | van der Lely | 172/59 X |
| 4,002,209 | 1/1977 | van der Lely | 172/59 |

FOREIGN PATENT DOCUMENTS 1,243,446  6/1967  Fed. Rep. of Germany .......... 172/523

Primary Examiner—Edgar S. Burr
Assistant Examiner—James R. Feyrer
Attorney, Agent, or Firm—Mason, Mason & Albright

[57] ABSTRACT

An implement has a forward structure that supports a fluid distribution system including soil penetrating tools, such as hoe bodies of freely rotatable tine groups through which fluid is ditributed across a broad path. The supporting structure is connectable to a three point tractor hitch and linked to a cultivator frame by a forward parallelogram linkage. The cultivator frame supports a row of driven soilworking rotors and to the rear of the rotors, a wheeled seeder device is mounted on a parallelogram structure so that it can move vertically independently of the suportng structure or cultivator frame. A further, rear parallelogram structure interconnects the rear of the first mentioned parallelogram structure to supporting ground wheels and a hydraulic cylinder is positioned above the rear structure to lift the seeder for transport. A stop is associated with the parallelogram structures to limit their relative movements.

16 Claims, 10 Drawing Figures

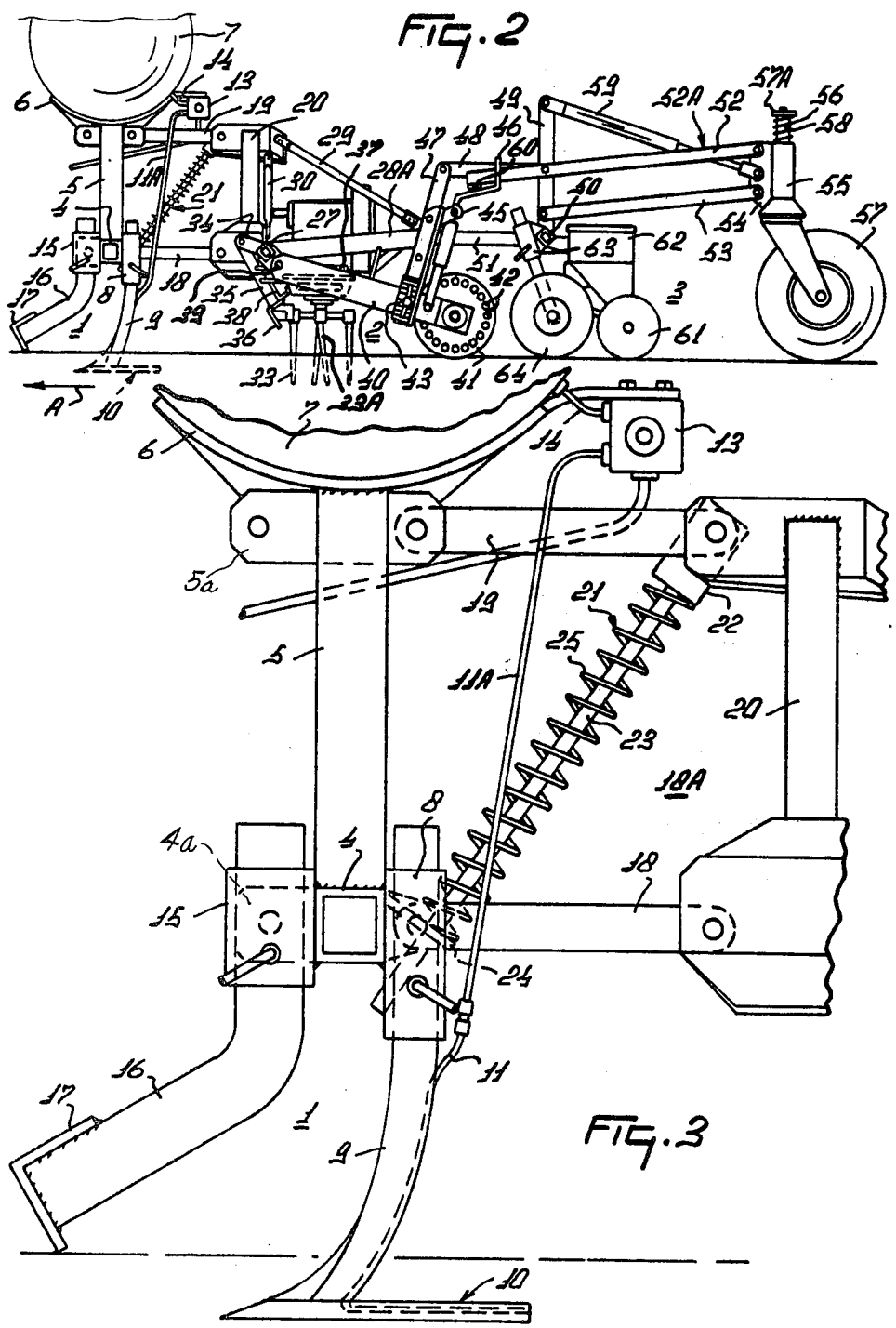

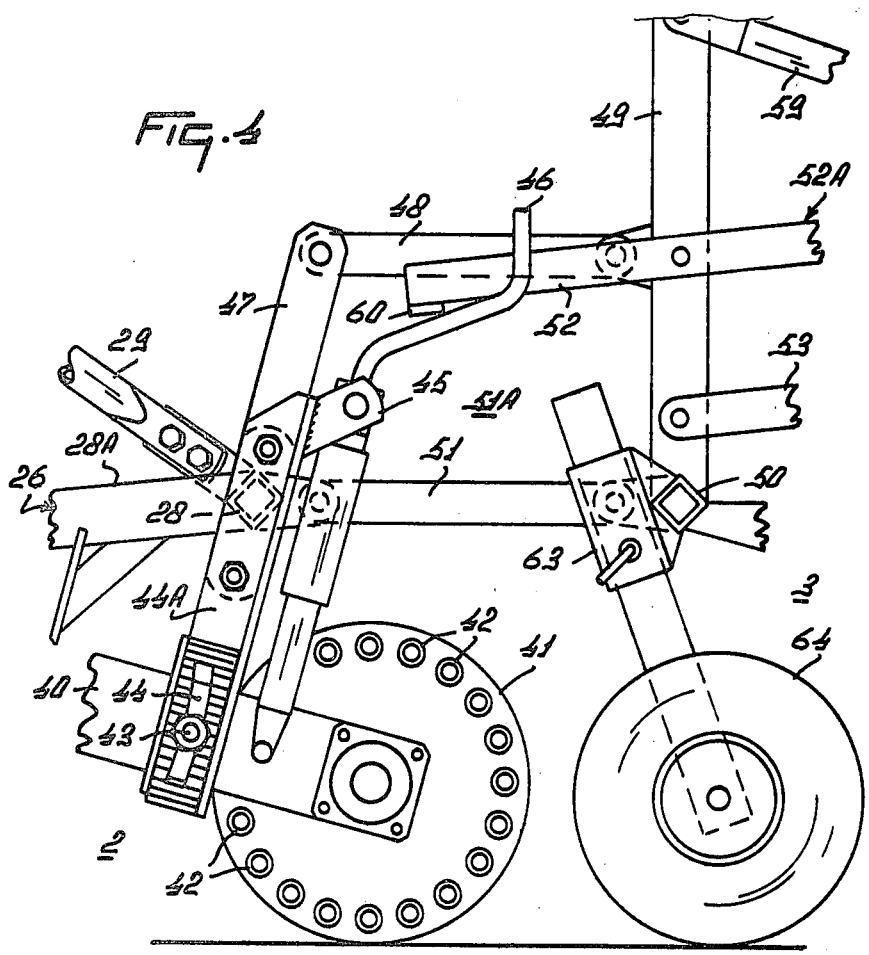
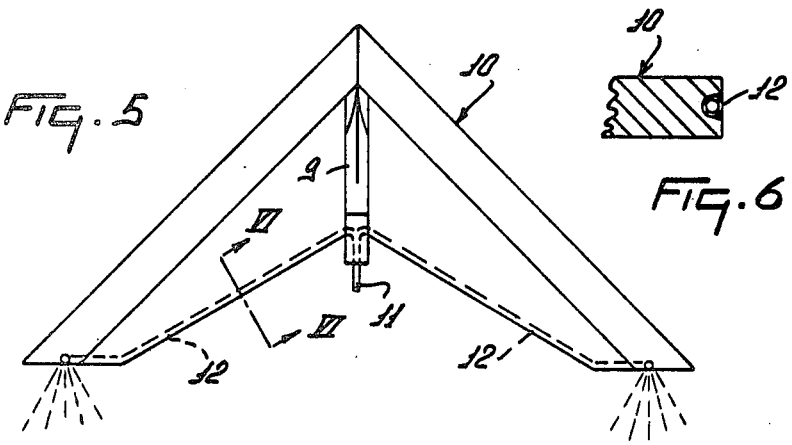

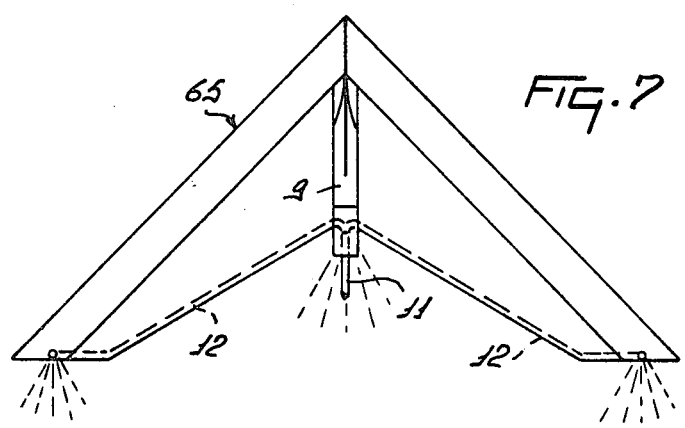
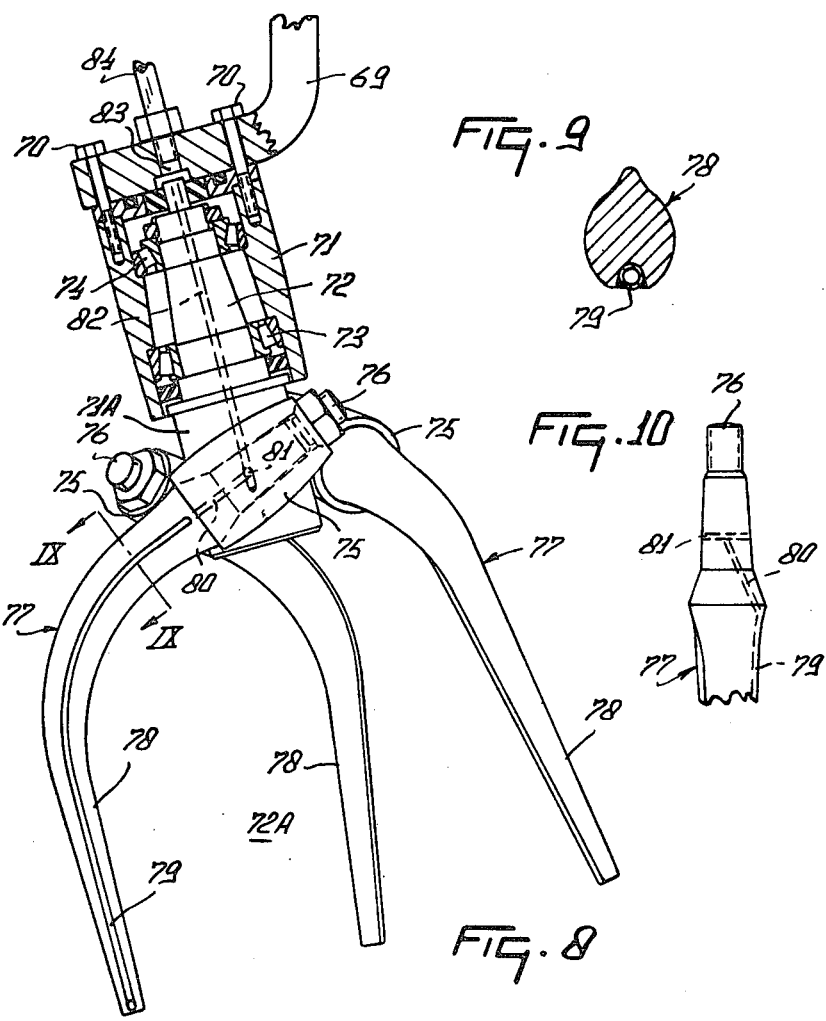

AGRICULTURAL IMPLEMENTS

According to the present invention there is provided an agricultural implement comprising a soil cultivating machine having cultivating members adapted to rotate about upwardly extending axes, and a device for applying seeds onto or into the ground, the implement having at least one supporting wheel adjustable in a direction of height and the device for applying seeds onto or into the ground being capable of moving in a direction of height, in operation, independently of the soil cultivating machine and of the supporting wheel.

With such a construction the sowing depth of the sowing mechanism once adjusted can be maintained independently of the movements of the soil cultivating machine and/or the ground wheel.

For a better understanding of the invention and to show how the same may be carried into effect, reference will now be made, by way of example, to the accompanying drawings, in which:

FIG. 1 is a plan view of an agricultural implement,

FIG. 2 is a side view of the implement taken in the direction of arrow II in FIG. 1, FIG. 3 shows on an enlarged scale and from the side a coupling between a device incorporated in the implement of FIGS. 1 and 2 for applying chemicals onto or into the ground, and the front of a soil cultivating machine of the implement, FIG. 4 shows on an enlarged scale and from the side a coupling between the soil cultivating machine (FIG. 3) and a device for applying seeds onto or into the ground that is incorporated in the implement, FIG. 5 shows on an enlarged scale and in plan a member incorporated in the implement for introducing chemicals into the ground, FIG. 6 is a cross-sectional view of a detail taken on line VI—VI in FIG. 5, FIG. 7 is a view similar to FIG. 5 of an alternative form of member for introducing chemicals into the ground, FIG. 8 is a sectional side view of a further form of member for introducing chemicals into the ground, FIG. 9 is a cross-sectional view taken on line IX—IX in FIG. 8, and FIG. 10 is a side view of a fastening portion of a tine of the member shown in FIGS. 8 and 9.

The agricultural implement shown in the Figures is a combination of three consecutively operating components. The first is the device 1 at the front of the implement intended for introducing chemicals into the ground. The second, to which the first is connected at the rear, is the soil cultivating machine which has cultivating members that rotate about upright shafts in operation. The third, which is to the rear of the soil cultivating machine 2, is the device 3 for applying seeds onto or into the ground.

The device 1 has a frame having a frame beam 4 extending transversely of the intended direction of operative travel A of the implement and provided at the front with three equidistant, substantially vertical supporting beams 5, one of which is located near the center. The top ends of these beams 5 are provided with brackets 6 supporting a cylindrical hopper 7, the longitudinal center line of which is located substantially over the frame beam 4. On the rear the beam 4 is provided with equidistant, upright sleeves 8 in which supports 9 of hoe bodies 10 are slidable in a direction of height, the bodies in the form illustrated being of the goose-foot type. Each support 9 of a hoe body 10 has at the rear a tube 11, the top end of which is spaced apart from the support 9 and which otherwise extends downwardly along the support. At the level of the hoe body 10 the tube 11 communicates with two rearwardly and laterally inclined parts or feeders 12, the outer end portions of which extend substantially transversely of the direction of travel A to terminate at outlets near the rear of the V-shaped hoe body (FIG. 5). The hoe body 10 has a width of about 80 centimeters, so that the outlets of the tube portions 12 are also spaced apart by approximately this distance. The top end of tube 11 communicates with a duct 11A running from a pump 13, which is located on the rear of the hopper 7 and communicates therewith through a duct 14. The pump 13 may be driven hydraulically from a tractor drawing the implement. On the front the beam 4 is provided near its ends with sleeves 15, in each of which an arm 16 is displaceable in the direction of height. The arms 16 have each a forwardly and downwardly inclined portion connected with a levelling beam 17 formed by an angle-section iron extending transversely of the direction of travel A, the limbs of the angle-section iron being respectively directed in rearwardly and upwardly and rearwardly and downwardly, inclined positions (FIGS. 2 and 3). On the front the frame beam 4 and the central supporting beam 5 are provided with coupling points for attaching the implement to the threepoint lift of a tractor.

Similar coupling points are provided on the rear of the beam 4. At these points arms 18 and 19 of a parallelogram structure 18A are pivotally connected and extend to the rear. The arms 18 and 19 are coupled at their rear ends with a trestle 20 on the frame of the soil cultivating machine 2. Between the topmost coupling point of the trestle 20 of the soil cultivating machine 2 and a point located between the lower coupling points on the rear of the frame beam 4 a spring mechanism 21 is provided that acts to hold the arms 18 and 19 in a given position. The spring mechanism 21 includes a bracket 22 pivoted to the top of the trestle 20 and disposed at one end of a rod 23, the other end of which is passed through a hole in a support 24 on the rear of the frame beam 4. Between the support 24 and the bracket 22 the rod 23 is surrounded by a compression spring 25. The trestle 20 is mounted on a frame 26 having two frame beams 27 and 28 spaced apart one behind the other and interconnected by means of supports 28A (FIG. 1). The foremost frame beam 27, which carries the trestle 20, is located at a lower level than the rearmost frame beam 28. From the top of the trestle 20 diverging supports 29 extend to the rearmost frame beam 28 and downwardly and outwardly inclined supports 30 extend to the foremost frame beam 27. Beneath the frame a hollow frame portion 31 extends transversely of the direction of travel A and is fastened by means of supports extending in the direction of travel A, this portion 31 accommodating at intervals of, preferably, 25 centimeters upright, preferably vertical shafts 32. The shafts 32 are provided at their ends projecting out of the bottom of the frame portion 31 each with a cultivating member 33 having a substantially horizontal support with holders at its ends for receiving fastenings portions of tines 33A. Each tine 33A has an operative portion extending away from the fastening portion and having its longitudinal center line at an angle of about 8° to the longitudinal center line of the fastening portion so that, viewed in the direction of rotation of the cultivating member 33, the operative portions of the tines 33A are in trailing positions. Inside the hollow frame portion 31 each of the shafts 32 is provided with a gear wheel 32A having straight teeth, the gear wheels on adjacent shafts being drivably connected with one another. At the front the frame beam 27 is provided with forwardly and upwardly inclined lugs 34, between which downwardly and rearwardly inclined arms 35 are pivotally arranged, the lower ends of these arms holding an angle-section iron 36 located in front of the top of the respective cultivating members 33 to serve as a protective member therefor. This protective member formed by the angle-section iron 36 is drawn towards the hollow frame portion 31 by springs 37 extending between the arms 35 and the rear of the hollow frame portion 31, and is in engagement by means of supports 38 with the front of the frame portion. The ends of the foremost frame beam 27 are provided with stub shafts 39 for arms 40, which are downwardly inclined to the rear and are provided at their free ends with bearings for the stub shafts of a rotatable supporting member 41 formed by a roller. The roller is provided at its circumference with elongated elements 42, extending in the direction of the rotary axis of the roller and in helical fashion. At a distance to the rear of its mid-point, each arm 40 has a stub shaft 43 passed through an elongated slot 44 in a support 44A fastened to the rearmost frame beam 28, the arm 40 thus being adjustable to and fixable in any selected one of a plurality of positions relative to the support 44A (FIG. 4). For the adjustment of the respective arms 40 a screw spindle 46 is provided between ears 45 on the rearmost frame beam 28 and the rear part of the arms.

At a distance from each end of the rearmost frame beam 28 supports 47 are slightly inclined to the rear in upward direction. The top end of each support 47 is pivoted to an arm 48, which is pivotally coupled with supports 49 on a frame beam 50 extending transversely of the direction of travel A and associated with a frame of the device 3 for applying seeds onto or into the ground. The frame beam 50 is pivotally connected by means of arms 51 extending in the direction of travel A with the rearmost frame beam 28 of the frame of the soil cultivating machine 2. The pairs of arms 48 and 51 form part of a parallelogram structure 51A. The upright supports 49 are provided with pivotable arms 52 and 53 located at a distance one above the other and associated with a parallelogram structure 52A, the arms 52 and 53 being slightly bent over outwardly (see FIG. 1) and having their rear ends pivoted to a supporting plate 54 secured to a vertical bearing bushing 55 for the pivotal shaft 56 of a supporting caster wheel 57, the pivotal shaft 56 extending substantially in a vertical direction. Between the top of the bearing bushing 55 and a stop 57A on the shaft 56 a compression spring 58 surrounds the shaft of the wheel. Thus in operation and during transport shocks can be effectively absorbed. Between the arms 52 and 53 each supporting plate 54 is connected with the fork of a piston rod of a hydraulic adjusting cylinder 59, the other end of which is pivoted to the top of a support 49. The topmost arm 52 of the parallelogram structure 52A extends to in front of a support 49 and is provided near its front end with a stop 60 adapted to co-operate with the topmost arm 48 of the parallelogram structure 51A. The beam 50 is provided with a mechanism 62 (shown schematically) for applying, for example, seeds onto or into the ground, this mechanism having driving wheels 61. Via the beams 50 and the parallelogram structure 51A and 52A the mechanism 62 is movable with respect to the soil cultivating machine 2 and the supporting wheels 57. The frame beam 50 is provided on the front near the ends with sleeves 63, whose longitudinal center lines are slightly inclined downwardly to the rear and which accommodate supports for ground wheels 64 so as to be displaceable in a direction of height, by means of which wheels the frame of the seed drill bears on the ground in operation.

In operation the device 1 for introducing chemicals into the ground at the front of the implement is coupled by means of the coupling points at the front with the three-point lift of a tractor and the implement is moved in the direction of the arrow A. The levelling beam 17 at the front then flattens a strip of soil over the width of the implement so that the three hoe bodies 10 traverse at substantially uniform depth the top layer of the ground having preferably a thickness of 6 to 8 centimeters with the aid of the hoe bodies 10 of the goose-foot type and of the tube portions 12 chemicals can be introduced into the ground from the hopper 7 via the pump 13, the duct 11A and the tube portions 12 on the rear of each support of a hoe body over a comparatively large width corresponding for each hoe body substantially with the effective width of three cultivating members of the soil cultivating machine. A substantially uniform distribution across adjacent strips is thus obtained.

The soil cultivating machine attached to the device 1 by means of the spring-controlled, pivotable parallelogram structure 18A formed by the arms 18 and 19 and driven by the power take-off shaft of the tractor can work the top layer of the soil then provided with the chemicals, the working depth of the cultivating members 33 being adjustable by means of the roller 41 located behind the cultivating members. The working depth of the rotatable cultivating members 33 will preferably slightly exceed the working depth of the hoe bodies.

The device 3 attached to the rear of the soil cultivating machine 2 by means of the parallelogram structures 51A can then sow seeds on or in the strip of soil containing the chemicals and being cultivated by the soil cultivating machine. In operation the sowing mechanism 62 can move in upward direction by means of the parallelogram structure 51A independently of the soil cultivating machine and the supporting wheels 57. The depth of sowing can be determined by means of the ground wheels 64 of the frame beam.

In order to change over the implement to a transport position the front portion can be lifted by the lifting device of the tractor and with the aid of the hydraulic adjusting cylinder 59 which may communicate with the hydraulic circuit of the tractor, the parallelogram structure 52A can be turned so that the stop 60 on the front of the topmost arm 52 of the parallelogram structure comes into contact with the topmost arm 48 of the parallelogram structure 51 between the soil cultivating machine and the seed drill and thus assists in lifting the combination. During transport the combination is carried by the lifting device of the tractor and the supporting wheels 57 on the rear.

By the construction described above the implement has a practical, very useful, compact structure, while the relative couplings by the various parallelogram structures impart great relative movability to the respective parts of the implement in operation. Owing to the parallelogram structures 51A and 52A the sowing mechanism 62 can match unevenesses of the ground independently of the soil cultivating machine 2 and of the supporting wheels 57, which is highly conducive to the uniformity of sowing. In order to change over to a transport position and during transport of the implement not only the lifting device of the tractor but also the caster wheels 57 at the rear of the implement can be used so that the lifting device of the tractor need not carry the whole weight of the combination.

FIG. 7 shows a second embodiment of a hoe body for introducing chemicals into the top layer of the soil. In this embodiment the hoe body 65 is provided with a third feeder for the chemicals. This third feeder is located between and in front of the two outermost feeders 12.

A further embodiment of a member for introducing chemicals into the ground is shown in FIGS. 8 to 10. In this embodiment the frame beam 4 is provided with downwardly and rearwardly inclined supports 69 which are bent over near their lower ends substantially at right angles to the front. Each of the ends is provided by means of bolts 70 with a sleeve 71, in which a stub shaft 72 is freely rotatable. The stub shaft 72 forms part of a rotatable spreading member 72A for introducing chemicals into the soil and is held by relatively spaced roller bearings 73 and 74. A thickened end 71A of the stub shaft 72 projects out of the sleeve 71 and is provided with equidistant, cylindrical, upwardly tapering holders 75 at its circumference, the longitudinal center lines of these holders crossing at an acute angle the longitudinal center line of the stub shaft 72 forming the rotary axis of the spreading member 72A and extending substantially in a tangential direction. The sides of this acute angle point downwards. Each of the holders 75 receives a fastening portion 76 of a tine 77, this fastening portion terminating outside the holder in an operative portion 78 initially extending in line with and away from the fastening portion and then terminating through a bend in a portion substantially parallel to the rotary axis of the member 72A. With respect to a plane passing through the longitudinal center line of a fastening portion 76 and extending parallel to the longitudinal center line of the stub shaft 72 the downwardly extending parts of the operative portions 78 are bent over to the rear with respect to the direction of rotation of the member 72, so that they are in trailing positions.

On the rear with respect to the direction of rotation, each of the operative portions 78 is provided with a tube 79 opening out near the free end of the operative portion and communicating near its junction with the fastening portion 76, with a bore 80 extending up to the center of the fastening portion. The bore 80 communicates through a bore 81 with a bore in the holder 75 (FIG. 10), which latter bore communicates with a bore 82 in the stub shaft 72. The bore 82 communicates with a bore 83, in the bent over portion of the support, which is joined by a duct 84, which is connected with the pump 13. In operation the respective spreading members 72A provided with the tines 77 are caused to rotate by the ground contact of the tines since the stub shaft 72 is inclined in the direction of travel. Through the pump 13 and the duct 84 chemicals can be fed from the hopper 7 during this rotation, the chemicals being introduced into the ground through the above-mentioned bores and ducts 79 on the rears of the operative tine portions. Thus the chemicals are spread in the upper layer of the soil over a comparatively large width of at least 30 centimeters, as in the foregoing embodiment. The spreading members 72A are arranged side by side in a row covering the whole working width of the soil cultivating machine 2 and have working ranges bordering one another.

While various features of the agricultural implements that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. An agricultural implement comprising frame means and a plurality of tined cultivating members mounted on an elongated portion of said frame, said members having respective upwardly extending shafts and being rotatable about corresponding axes defined by said shafts, driving means connected to said members and rotating said members to work the soil, the front of said frame means including a supporting structure that is linked to said frame portion by a first parallelogram linkage being positioned in front of said members and soil penetrating tools mounted on said supporting structure, said tools having fluid distribution means in communication with a fluid container of said implement to distribute fluid in advance of said cultivating members, at least one seeding device being mounted on a second parallelogram linkage of said frame means and said device being positioned to the rear of said members, said supporting structure comprising coupling means and said second linkage including a forward trestle having coupling points connected to said coupling means, the rear of said frame means being linked to supporting ground wheel means, said tools comprising tined members and said tined members being freely rotatable about respective upwardly extending axes responsive to contact with the soil.

2. An implement as claimed in claim 1, wherein said tools are positioned to work adjacent strips of soil and distribute fluid in advance of said cultivating members.

3. An implement according to claim 1, wherein said supporting structure is a forward beam that is interconnected with the remainder of the frame means by said first parallelogram linkage.

4. An implement according to claim 3, wherein said second parallelogram linkage includes a rear beam and at least one seeding device is mounted on said rear beam, said seeding device being vertically displaceable relative to said cultivating members during operation about pivots of the second linkage.

5. An implement according to claim 4, wherein the shafts of said cultivating members depend from said driving means housed in an elongated hollow frame portion.

6. An implement according to claim 5, wherein a coupling trestle is mounted on the front side of said frame portion and said trestle comprises a rear side of the second parallelogram linkage.

7. An implement according to claim 6, wherein said forward beam comprises a part of said coupling means and the latter is a three-point coupling member, upwardly extending beams of that member comprising a front side of the first mentioned linkage.

8. An implement as claimed in claim 4, wherein a support wheel is pivoted to said rear beam by a third parallelogram linkage, said third linkage having pivotable arms that extend rearwardly from the frame means to said wheel.

9. An implement as claimed in claim 8, wherein said pivotable arms comprise stops positioned adjacent and within said second linkage, adjusting means interconnecting the second and third linkages to raise the rear beam together with said seeding device relative to the support wheel into a transport position.

10. An agricultural implement comprising a frame, a fluid container mounted on said frame and a plurality of tined cultivating members supported on respective upwardly extending shafts said members being rotatable about axes defined by said shafts and driving means connected to rotate said members about said axes, said implement including a plurality of earth penetrating tools that are rotatable about respective upwardly extending axes, and said tools being positioned to distribute fluid across a broad path transverse to the direction of travel in advance of said cultivating members, said tools comprising groups of tines and said groups being mounted for free rotation on respective stub shafts responsive to contact with the soil, at least some of said tines having openings adjacent the lower free ends of said tines and external tubes that extend upwardly from said openings, each external tube being in communication with corresponding bore means in the respective tine and said bore means communicating with further bores in the stub shafts that are in communication with ducts through which fluid is adapted to be pumped from said fluid container.

11. An agricultural implement as claimed in claim 10, wherein each tine comprises a lower operative portion extending from a free end substantially parallel to the rotary axis of the respective spreading member and being then bent over to extend in the direction towards said spreading member rotary axis.

12. An agricultural implement as claimed in claim 11, wherein each tine has a fastening portion fixed in a holder provided on a respective stub shaft, the longitudinal center line of said stub shaft extending substantially tangentially to the rotary axis of the corresponding spreading member.

13. An agricultural implement as claimed in claim 12, wherein, viewed in a direction at right angles to the rotary axis of said spreading member, the longitudinal center line of said holder intersects said spreading member rotary axis at an acute angle.

14. An agricultural implement as claimed in claim 11, wherein said external tube is mounted on the rear of the operative tine portion and a first-mentioned bore extends through a fastening portion of said tine and said first mentioned bore communicates with a second bore in said holder and said further bore in said stub shaft.

15. An agricultural implement as claimed in claim 11, wherein three tines are arranged at equal circumferential angles from one another about the rotary axis of each spreading member.

16. An agricultural implement as claimed in claim 11, wherein said operative tine portion of each tine is in a trailing position relative to the intended direction of operative rotation of said tine.

* * * * *